United States Patent [19]

Gessell

[11] Patent Number: 4,603,183

[45] Date of Patent: Jul. 29, 1986

[54] HYDROCARBON SOLUBLE CATALYST SUPPORTS AND RESULTANT POLYMERIZATION CATALYSTS

[75] Inventor: Donald E. Gessell, Ponca City, Okla.

[73] Assignee: E. I. Du Pont de Nemours & Co., Wilmington, Del.

[21] Appl. No.: 685,628

[22] Filed: Dec. 24, 1984

Related U.S. Application Data

[60] Division of Ser. No. 523,868, Aug. 18, 1983, Pat. No. 4,518,706, which is a continuation-in-part of Ser. No. 429,387, Sep. 30, 1982, abandoned.

[51] Int. Cl.$^4$ .......................... C08F 4/02; C08F 10/00
[52] U.S. Cl. ........?............................. 526/124; 526/116; 526/119; 526/122; 526/348.2; 526/352
[58] Field of Search ................ 526/116, 119, 122, 124

[56] References Cited

U.S. PATENT DOCUMENTS

| | | | |
|---|---|---|---|
| 3,901,863 | 8/1975 | Berger et al. | 526/124 |
| 4,223,118 | 9/1980 | Tsubaki et al. | 526/127 |
| 4,374,755 | 2/1983 | Berge et al. | 526/127 |
| 4,440,869 | 4/1984 | Shannon et al. | 526/124 |
| 4,490,513 | 12/1984 | Minami et al. | 526/127 |

Primary Examiner—Edward J. Smith
Attorney, Agent, or Firm—Cortlan R. Schupbach

[57] ABSTRACT

A method is provided for preparing hydrocarbon soluble magnesium siloxide supports comprising contacting such supports with sufficient aluminum alkoxide or organic ethers to render the supports hydrocarbon soluble. Thereafter the supports are contacted with a transition metal compound and halogenated to obtain polymerization catalysts.

6 Claims, No Drawings

HYDROCARBON SOLUBLE CATALYST SUPPORTS AND RESULTANT POLYMERIZATION CATALYSTS

This is a division of application Ser. No. 523,868, filed Aug. 18, 1983, now U.S. Pat. No. 4,518,706, which is a continuation-in-part of Ser. No. 429,387, filed Sept. 30, 1982, now abandoned.

This invention relates to hydrocarbon soluble magnesium and silicon containing supports for olefin polymerization catalysts. More specifically, this invention relates to a method of preparing such supports utilizing aluminum alkoxides or organic ethers as solubilizing agents and to a method of preparing catalysts from these hydrocarbon soluble supports.

The art recognizes that active olefin polymerization catalysts can be made by supporting a titanium chloride species on a magnesium halide alkoxide or oxide species. In some cases suitable electron donating compounds have been used in such synthesis. Many of these procedures have suffered from being either lengthy or complex and further require extensive washings of the catalyst. These extensive washings are often necessary to obtain acceptable catalyst efficiency and are tedious and expensive.

Representative but non-exhaustive of the art dealing with magnesium containing olefin polymerization catalysts is U.S. Pat. No. 4,223,118, which describes a polymerization catalyst in which a titanium halide is reacted with a magnesium siloxide in the presence of an aluminum alkoxide. U.S. Pat. No. 4,027,089 is representative of a group of patents in which magnesium aluminum complexes containing alkoxy or siloxy groups are used to prepare polymerization catalysts. These references require that the alkoxy or siloxy ratios, when compared to the aluminum plus magnesium ratios, be below about 0.8, a titanium compound having at least one halogen atom. The examples show catalysts prepared at Cl/Mg atomis ratios of 5-10 yielding a narrow molecular weight distribution polyethylene. U.S. Pat. Nos. 4,330,646; 4,330,647; 4,330,651; 4,335,229 describe polymerization catalysts having mole ratios of alkoxy plus siloxy to magnesium plus aluminum less than 2.0. U.S. Pat. No. 4,218,339 describes polymerization catalysts prepared by reacting the reaction product of an alkyl magnesium chloride and polymethylhydridosiloxane with tetra-n-butyltitanate and silicon tetrachloride. Highest catalytic activity in this reference is shown in Example 20. The reference describes various halogenating agents which are useful, but does not include the use of aluminum compounds containing chloride.

U.S. Pat. No. 3,907,759 teaches a magnesium chloride siloxide dissolved in an aromatic hydrocarbon such as toluene and containing about 0.4 moles of tetrahydrofuran per mole of magnesium. This reference also describes a reaction product of a hydropolysiloxane such as polymethylhydridosiloxane and a Grignard reagent such as a dihydrocarbomagnesium containing up to 1.5 moles of tetrahydrofuran per mole of magnesium as insoluble in n-heptane or n-hexane.

The bulk of these catalysts have an insoluble and a soluble portion which have to be separated after the catalyst preparation is complete. The insoluble portion alone is an acceptable catalyst. However, during catalyst preparation it is preferred that the catalyst components be soluble until the final catalyst is obtained. Solubility of these materials until the final preparation step would lead to better particle size distribution. This produces a polymer powder from a slurry polymerization process having better polymer powder flowability, polymer powder transfer and better drying of the polymer powder in the various process steps of commercial facilities.

It is also easier to carry out a catalyst preparation in a production plant if the catalyst components are liquids or solutions and can be stored in non-agitated vessels and transferred to other vessels by means of pumps without having to consider the settling rates of suspended solids or transferring of solids under an inert atmosphere.

It would therefore be of great benefit to provide a method of making soluble catalyst supports which provide high activity finished catalysts.

It is therefore an object of the present invention to provide a method for preparing hydrocarbon soluble magnesium and silicon containing supports. It is a further object of the present invention to provide a method for making catalysts from such supports. Other objects will become apparent to those skilled in this art as the description proceeds.

I have now discovered that olefin polymerization catalyst supports having the general formula

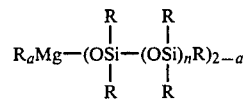

can be prepared in a hydrocarbon soluble form by contacting these materials with aluminum alkoxides having the general formula

or organic ethers having the formula $R^2$—O—$R^3$ wherein each Q can be $R^1$ or $OR^1$, but at least one Q must be $OR^1$ and wherein the organic ethers can optionally have mutually covalent bonds between $R^2$ and $R^3$ to form cyclic ethers, and wherein R, $R^1$, $R^2$, and $R^3$ are, independently, alkyl groups containing from 1 to 20 carbon atoms, aryl, aralkyl, and alkaryl groups, each containing from 6 to 20 carbon atoms, and wherein R can, in addition, be hydrogen or alkoxy groups containing from 1 to 20 carbon atoms, and wherein a is 0 or 1 and n is 0 or greater than 0. Generally, n will range from about 0.05 to about 100. Mixtures of alkoxides and ethers can be used.

Magnesium silicon supports wherein a is 0, and n is 0 are described in U.S. Pat. No. 4,374,755. However, these materials contain hydrocarbon insoluble species and are utilized in catalyst formation by contacting these materials with titanium halides to form a precipitate which acts as an active catalyst.

In the process of the present invention, active catalysts are prepared by contacting solublized material with a non-halide transition metal alkoxide having at least one of the general formulas

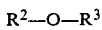

or $$R^4O[M(OR^4)_2O]_pR^4$$

or $$R^4{}_xM(OR^4)_y$$

wherein M is titanium, vanadium, chromium, or zirconium, and $R^4$ is an alkyl group containing from 1 to 20 carbon atoms, aryl groups, alkaryl groups and aralkyl groups, each containing from 6 to 20 carbon atoms, g is 0 or 1, r is 2 to 4 and $2g+r$ is equal to the valence of M; p is at least 2; and $x+y$ is equal to the valence of M.

Once the solubilized magnesium silicon supports have been contacted with the non-halide transition metal alkoxides, the resulting solution is reacted with a halogenating agent to obtain a polymerization catalyst having a halogen to magnesium ratio of at least 2.0.

Representative but non-exhaustive examples of magnesium and silicon materials which are useful in the present invention when $n=0$ are trimethylhydroxysilane, triethylhydroxysilane, triphenylhydroxysilane, methyldiphenylhydroxysilane, benzyldiphenylhydroxysilane, diethyldihydroxysilane, dipropyldihydroxysilane, dialkyldihydroxysilane, dicyclohexyldihydroxysilane, diphenyldihydroxysilane, butyltrihydroxysilane and phenyltrihydroxysilane.

Representative but non-exhaustive examples of these materials when (n) can be greater than 0 are polymethylhydrosiloxane (PMHS), polyethylhydrosiloxane, polymethylhydridodimethylsiloxane copolymer, polymethylhydromethyloctylsiloxane copolymer, polyethoxyhydrosiloxane, tetramethyldisiloxane, diphenyldisiloxane, trimethylcyclotrisiloxane, tetramethylcyclotetrasiloxane, polyphenylhydrosiloxane, polychlorophenylhydrosiloxane. These polymeric silicon compounds can be bound to magnesium, be present in the catalyst as free polymers, or both.

When a polymeric compound such as polymethyl hydrosiloxane is reacted with a dialkylmagnesium, a magnesium siloxane of the formula

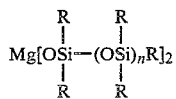

where n is greater than 1 is formed initially when dialkylmagnesium is present at low levels compared with the PHMS. This species can then react with additional alkylmagnesium to ultimately produce magnesium siloxide supports where n equals 0.

Representative but non-exhaustive examples of the aluminum alkoxides or alkyl aluminum alkoxides of the present invention are diethylaluminum ethoxide, aluminum isopropoxide, aluminum n-propoxide, aluminum methoxide, aluminum sec-butoxide, aluminum decoxide, diethylaluminum phenoxide and aluminum growth product produced in Ziegler alcohol processes, whereas the oxidized growth product is prepared by oxidation of aluminum alkyls with oxygen or air. The aluminum alkoxides may be prepared in-situ by reacting an alcohol with a trialkylaluminum as is known in the art.

Representative but non-exhaustive examples of organic ethers useful in solubilizing the materials of the present invention are tetrahydrofuran, diethylether, dibutyl ether, dioxane, diamyl ether, anisol, dipropyl ether, phenyl ethyl ether, or mixtures thereof.

Representative but non-exhaustive examples of the non-halide transition metal alkoxides of the present invention are tetraisopropyltitanate, tetra-n-butyltitanate, tetrabis (2-ethylhexyl)titanium, tri-n-butyl vanadate, tetra-n-propylzirconate and tetra-n-butylzirconate, isopropyl titanate decamer, i.e. iso—$C_3H_7$—O(-Ti(O—iso—$C_3H_7)_2$—O]$_{10}$ iso$C_3H_7$, butyl (triisopropoxy) titanium and mixtures thereof.

Representative but non-exhaustive examples of the halogenating agents of the present invention are ethylaluminum dichloride, diethylaluminum chloride, ethylaluminum aluminum sesquichloride, methyl and isobutyl analogues of these, tin tetrachloride, silicon tetrachloride, hydrogen chloride, trichlorosilane, aluminum chloride, ethylboron dichloride, boron chloride, diethylboron chloride, chloroform, phosphorous trichloride, phosphorous oxytrichloride, acetyl chlorides, thionyl chloride, sulfur chloride, methyl trichlorosilane, dimethyl dichlorosilane, titanium tetrachloride, vanadium oxytrichloride, and vanadium tetrachloride.

Transition metal halide halogenating agents are not as preferred as non-transition metal halides for the purpose of the present invention. It appears that the transition metal halides provide an excess of transition metal to the reaction, which transition metal is not fully reduced and thus decreases catalytic activity. However, these materials are operable in the present invention. Most preferred halogenating agents are chlorinating agents and of these diethylaluminum chloride, ethylaluminum dichloride ethylaluminum sesquichloride and methyl and isobutyl analogues of these are preferred.

In addition, it has been discovered that reaction of a titanium halide with the hydrocarbon soluble magnesium siloxide described in the present invention produces solid catalysts which are high efficiency catalysts for the polymerization of ethylene. Also it has been discovered that treatment of a mixture of a titanium halide compound and the magnesium siloxides of this invention with an optimal halogenating agent from the previously listed compounds will greatly improve the catalyst efficiency based on grams of polyethylene per gram of titanium. While theoretical in nature, and I do not wish to be bound, I believe improved efficiency occurs because the Mg/Ti atomic ratio and the Cl/Mg atomic ratios are optimized independently of each other. If the titanium compound is used as the source for both the halogen and the titanium, then a reduced catalyst efficiency is obtained.

Solubilizing agents can be added before, during or after formation of the magnesium silicon compounds. These materials can be formed in-situ for example as when trialkyl aluminum or magnesium alkyl/aluminum alkyl mixture together with an alcohol are used. Most preferred solubilizing agents are those containing alkyl groups having from 1 to 8 carbon atoms such that the aluminum alkoxides or organic ethers which can complex the magnesium silicon compound without steric hinderance.

For the purposes of the present invention the term "hydrocarbon solubility" means solubility in saturated aliphatic hydrocarbons. Specifically, solubility can be determined as capability when forming a solution with n-hexane at 25° C. at a concentration of at least 0.01 molar. Representative but non-exhaustive examples of saturated hydrocarbons are n-heptane, n-hexane, cyclohexane, isononane, isohexane, cycloalkane, low-polynuclear aromatic solvent isooctane, isopentane, isobutane, pentane, butane and the like.

The catalysts of the present invention are useful in both solution and slurry polymerization. However, the catalysts must be treated differently and will provide different effects when used in a slurry as compared to solution polymerization system.

In slurry polymerization systems I have found that altering the halogen to magnesium ratio alters the molecular weight distribution. For example, changing the halogen as represented by the chlorine to magnesium ratio from a 4:1 to 8:1 respectively broadens the molecular weight distribution of the polymer. It is preferred that the ratio of halogen, preferably chlorine to magnesium range from about 3:1 to about 16:1 respectively. I have found that the activity tends to increase and then decrease as the ratio of chlorine to magnesium is increased. However, I have also found that the molecular weight distribution of polymer produced using these catalysts tends to broaden as the halogen to magnesium atomic ratio is increased from 4:1 to 8:1 respectively (4 to 8 when magnesium, is regarded as a constant 1). An atomic ratio in the range of about 6:1 to about 10:1 halogen to magnesium is most preferred for a broad molecular weight distribution polymer.

While the chlorine to magnesium ratio affects molecular weight distribution in slurry systems, it has been surprisingly found that the polymer molecular weight distribution is little affected in solution polymerization systems. However, the catalyst activity has a maximum possible value over a range of specific Cl/Mg ratios. The surprising reversal of effect on efficiency and molecular weight distribution between solution and slurry polymerization systems has not been explained, but definitely exists. This result can be seen by an examination of Examples 15 to 21 as compared to Example 23.

The catalysts of the present invention provide narrow and broad molecular weight distributions in the obtained polymer. The molecular weight distribution in slurry polymerization systems can be altered by the variation of Cl/Mg atomic ratio in catalyst based on Mg supports, whether soluble or insoluble. This effect is seen only when excess chloride is added using an aluminum-containing compound or a boron-containing compound, since both general types of compounds have similar function and behave similarly. This effect is not seen under solution polymerization conditions.

When a silicon compound such as silicon tetrachloride is used as the halogenating agent, a narrow molecular weight distribution polymer is produced even at high Cl/Mg atomic ratios. Replacing the halogenating agent with a tin halide such as tin tetrachloride results in a polymer having only a marginally broadened molecular weight distribution at high Cl/Mg atomic ratios.

In carrying out a slurry polymerization the magnesium to titanium ratio should be at least 1:1, and generally range from about 1:1 to about 50:1 respectively, while the preferred range is from about 5:1 to about 25:1 respectively. Note should be taken that in slurry polymerization systems as the magnesium to titanium atoxic ratio increases, polymer bulk density goes down while catalyst efficiency (grams of polymer per gram of transition metal) increases. It is therefore apparent to those skilled in this art that a balance between catalyst efficiency and polymer bulk density must be obtained.

The catalyst of the present invention for use in both slurry and solution systems, is prepared so that the silicon to magnesium molar ratio is such that substantially all of the magnesium alkyl is converted to magnesium siloxides. It should be noted that an excess of some silicon compounds such as polymethylhydridosiloxane is not detrimental except to catalyst cost and, in fact, sometimes has advantages such as in slurry powder bulk densities. The silicon to magnesium atomic ratio must be at least 2:1 but can be much higher, the excess silicon being free silicon polymers as described in the present specification, or a polymeric siloxane bound to the magnesium. In addition, catalyst efficiency in slurry polymerization is affected by the Si/Mg atomic ratio. The preferred atomic ratio for optimum catalyst efficiency is at least 2.0/1.0 (Si/Mg) to about 4.0/1.0 (Si/Mg). Lower atomic ratios are detrimental to catalyst efficiency and higher ratios show no significant improvement.

In solution polymerization systems, magnesium to titanium atomic ratios should be at least 1:1, and should range from about 5:1 to about 200:1 respectively, but the most preferred range is from about 10:1 to about 100:1. As the atomic ratio of magnesium to titanium increases, catalyst efficiency increases, however along with this catalyst efficiency increase is found an increase in catalyst residues associated with magnesium. Most notable of such residues are chloride ions. Therefore those skilled in the art will realize that the magnesium to titanium ratio must be selected to compromise between chloride and titanium levels in the polyethylene obtained, since chloride levels which are too high provide a corrosive polyethylene, and in contrast low titanium levels are required for color-free or white polyethylene.

The catalysts of the present invention are activated with a co-catalyst as is known in the art for Ziegler/Natta catalysts. The co-catalysts of titanium ratio ranges from about 1 to 10,000, preferably from 1 to 2,000. Typically, the co-catalyst is an aluminum alkyl. Representative but non-exhaustive examples of aluminum alkyl useful as co-catalysts are those having the formula $Al(R^2)_3$ wherein $R^2$ denotes alkyl groups containing from 1 to 20 carbon atoms, hydrogen, halide or alkoxide, and at least one $R^2$ is alkyl and least two $R^2$ are alkyl, wherein one $R^2$ is a halide or alkoxide.

High co-catalyst to catalyst ratios are preferred to scavenge impurities. However, high ratios also have a detrimental effect in that the co-catalysts tend to over reduce the titanium and render the catalyst less active. This lowering of activity is especially true in solution polymerization operated at high reaction temperatures. Cocatalysts such as aluminum alkyls are also known to solubilize magnesium compounds at high temperatures with the result that under solution conditions the catalyst support is erroded and dissolved by the high aluminum concentration. Therefore, in solution polymerization low co-catalyst to catalyst ratios (preferably aluminum to titanium) are often best. Under slurry polymerization conditions, higher aluminum to titanium ratios give better catalyst activity. In solution conditions, however, I have found that the reactions carried out at temperatures at or below about 150° C. the aluminum to titanium ratios should be high, paralleling slurry conditions. However, for reactions carried out above about 220° C., the aluminum to titanium ratios should be adjusted lower in order to obtain optimum catalyst efficiency (grams polyethylene per gram transition metal.

Preferred co-catalyst to catalyst mole ratios based on transition metal are therefore from about 10 to about 2000. These ratios range from about 50 to 500 for slurry polymerization conditions. Under solution polymerization conditions, preferred co-catalyst to catalyst ratios range from about 10 to about 100.

In preparing the catalysts of the present invention, one of several alternate procedures can be used. In one method the catalyst preparation is heated after the halogen ions are added. Temperatures of from about 30 to about 150° C. and for times ranging from about 10 minutes to several hours. The catalyst can be heated for a sufficient time and this will vary widely since some halogen sources tend to react sluggishly. Heating thus improves this reaction as do length and contact times. In a preferred method, the components are simply mixed at temperatures of from about 0° C. to about 100° C., preferably from about 10° C. to about 40° C.

An alternate method of catalyst preparation requires decanting of the hydrocarbon solvent mixed with a soluble halogen (preferably chlorine) source after the chloride is added. However, this method provides no advantage over the other method unless a large excess of the halogen source is added. Large excesses of halogen can reduce the chlorine or halogen content of the polyethylene in solution polymerization and removed reaction by-products.

Thus, these catalysts are useful in both solution polymerizations and slurry polymerization systems. In solution polymerization systems the catalyst is useful at temperatures ranging from about 120° C. to about 300° C. While in slurry polymerization conditions, the catalyst is useful under conditions known to those skilled in this art, normally about 40° C. to about 90° C. and reactor pressures of 0 to 40,000 psig. The use of hydrogen to control molecular weight in either system is known. These catalysts may generally be used in place of prior art catalysts without modification.

The catalysts of the present invention will normally be effective when residence time parameters are observed. In slurry polymerization systems the residence time should range from about 30 minutes to about 10 hours usually from about 1 to 5 hours, while in solution polymerization systems the residence time should range from about 10 seconds to several hours, but usually from about 1 minute to about 1 hour.

These differences in residence times are due to polymerization rates and thermal deactivation of the catalyst in solution systems. Slurry polymerization temperatures give lower polymerization rates but catalysts are active for longer periods, so increased residence time can be used to obtain good catalyst utilization. Solution polymerization in contrast has high polymerization rates but catalysts will thermally deactivate such that the catalyst activity decreases rapidly with time and usually becomes relatively inactive after about one hour.

The instant invention can be carried out in either continuous or batch polymerization for commercial use continuous polymerizations are preferred. Likewise, the polymerization reactor commonly is a tube or a stirred tank reactor in common use, but any reactor can be utilized which brings the ethylene and catalyst into contact.

Control of molecular weight can be done utilizing hydrogen as is known in the art. In addition, molecular weight control can be controlled by reactor temperature or a combination of hydrogen and reactor temperature in both slurry and solution. Normally, higher temperatures will reduce molecular weight, although this effect is seen more acutely in solution polymerization systems than in slurry polymerization systems.

The invention is more concretely described with reference to the examples below wherein all parts and percentages are by weight unless otherwise specified. The examples are provided to illustrate the present invention and not to limit it.

In the examples which follow, dibutyl magnesium obtained from the Lithium Corporation of America is a solution in heptane. Polymethylhydridosiloxane (PMHS) was obtained from Petrarch Systems, Inc. Triethylaluminum (TEAL) and ethylaluminum dichloride (EADC) were obtained from Texas Alkyls Inc. as solutions in hexane. ISOPAR$^R$G is an isoparaffinic mixture of saturated hydrocarbons obtained from Exxon Company, U.S.A. All other chemicals were reagent grade and used as received, except for hexane which was purified with molecular sieves and nitrogen purged to remove traces of oxygen and water.

Use of aluminum alkoxides as a solubilizing agent is set forth in the Examples below.

EXAMPLE 1

The reaction of RMgR, $AlQ_3$, alcohol and PMHS is illustrated. Seventy-five milliliters (ml) of a 2.0 molar n-propyl alcohol (150 millimoles) solution in hexane was added slowly to a stirred solution of 84.3 molar triethylaluminum (50 millimoles) and 140 ml of 0.715 molar dibutylmagnesium (100 millimoles). Polymethylhydridosiloxane (PMHS, 12.8 ml, 210 millimoles Si) was added and the resultant solution was heated at 65°–75° C. for one hour. After cooling to room temperature, a solution was obtained.

EXAMPLE 2

The order of addition, $AlQ_3$, alcohol RMgR and PMHS wherein the ratio of $AlQ_3$ to magnesium is 0.1 is illustrated.

Thirty milliliters of a 2.0 molar n-propyl alcohol (60 millimoles) solution in hexane was slowly added to a stirred solution of 33.7 ml of 0.593 molar triethylaluminum (20 millimoles), followed by 280 ml of 0.715 molar dibutylmagnesium (200 millimoles). Then, 12.8 ml polymethylhydridosiloxane (210 millimoles Si) was added. After heating the stirred mixture for one hour at about 70° C., the solution was cooled to room temperature and diluted to 500 ml with hexane. More polymethylhydridosiloxane (12.8 ml, 210 millimoles Si) was added and the solution heated to 80° C. for one-half hour. After cooling to room temperature, the solution was diluted to 500 ml with hexane to make up the hexane lost in evaporation during the heating. After standing for 19 days, this solution became a viscous gel.

EXAMPLE 3

The results of reacting only RMgR and PMHS is set forth as a comparison. Polymethylhydridosiloxane (13.4 ml, 220 millimoles Si) was added to a solution of 100 ml hexane and 140 ml of 0.715 molar dibutylmagnesium. An exothermic reaction took place and the mixture turned to a solid gel.

EXAMPLE 4

The reaction of $AlQ_3$, alcohol, RMgR and PMHS, wherein the aluminum alkoxide to magnesium ratio is 0.5 is illustrated. The procedure of Example 2 was repeated exactly except using 169 ml of 0.593 molar triethylaluminum (100 millimoles) and 150 ml of 2.0 molar n-propyl alcohol in hexane so that the Al(OR$_3$)/Mg ratio was increased to 0.5. After 19 days, the resultant solution was unchanged in physical appearance.

EXAMPLE 5

The utility of the solubilized material of the present invention as a polymerization catalyst and was determined experimentally. The solubilized components of Example 1 were utilized. Polymethylhydridosiloxane (12.8 ml, 210 mmoles Si) was added to a stirred solution of 33.7 ml of 0.593 molar triethylaluminum, 30.0 ml of 2.0 molar n-propylalcohol in hexane, and 280 ml of 0.715 molar dibutylmagnesium. The mixture was heated for one hour at about 70° C. Hexane was added to give a volume of about 500 ml and 12.8 ml of polymethylhydridosiloxane was added. The solution was heated to about 80° C. for ½ hour and the volume adjusted to 500 ml. A portion of the above solution (125 ml) was mixed with 2.0 ml of 1.0 molar tetraisopropyltitanate in hexane. The solution was stirred and 87 ml of 1,149 molar ethylaluminum dichloride was added dropwise in about ½ hour. A portion of the catalyst slurry was diluted with hexane. An aliquot of this dilute catalyst containing 0.001 millimoles of titanium was added to a nitrogen purged, stirred, 1.8 liter reactor containing 600 ml of dry, oxygen-free hexane and 1.7 ml of 0.593 molar triethylaluminum. The reactor was pressured to 50 psig with hydrogen and vented to 0 psig. The procedure was then repeated three more times. The reactor pressure was adjusted to 30 psig with hydrogen and then 100 psig with ethylene. The reactor contents were heated to 80° C. and then ethylene was added to maintain a constant reactor pressure of 150 psig. After one hour, the reactor was cooled and vented. The reactor contents were filtered and the polyethylene dried in a vacuum oven at 70° C. until free of hexane. The polyethylene weighed 153.1 grams and had a melt index (ASTM 1238, condition E) of 1.3. The catalyst efficiency was 3,200,000 grams of polyethylene per gram of titanium.

EXAMPLE 6

The catalyst preparation procedure of Example 5 was repeated except the amounts of aluminum alkoxide (triethylaluminum plus n-propyl alcohol) used for solubilization was increased so that the magnesium siloxide solution had an $Al(OR)_3/Mg$ molar ratio of 2.

Using the above catalyst, the polymerization procedure of Example 5 was repeated using an aliquot of catalyst containing 0.005 millimoles of titanium. The polyethylene produced weighed 2.5 grams. The catalyst efficiency was 10,400 grams of polyethylene per gram of titanium.

EXAMPLE 7

An example was carried out to show the effect of organic ether when present during the reaction of PMHS and RMgR. A solution of 140 ml dibutylmagnesium (100 millimoles) and 4.1 ml THF (50 millimoles was prepared at 50° C. and 13.4 ml of PMHS (200 millimoles) was added slowly enough that the exotherm reaction did not heat the solution above about 75° C. The mixture was held at 75° C. for one hour by heating with a heating mantel. After cooling to room temperature, a solution was obtained.

EXAMPLE 8

An experiment was carried out to show the effect of an organic ether on a reaction product of RMgR and PMHS. PMHS (6.4 ml, 105 millimoles) was added to a stirred solution of 69.9 ml dibutylmagnesium (50 millimoles) and 130 ml hexane. In a few minutes, a solid gel had formed and the magnetic stir bar would no longer stir the mixture. THF (2.0 ml, 25 millimoles) was added to the solid gel and the gel rapidly liquified. After mixing, a solution was obtained.

EXAMPLE 9

Experiments were carried out to determine the minimum amount of organic ether required to solubilize the reaction product of RMgR and PMHS.

PMHS (6.4 ml, 105 millimoles) was added to a stirred solution of 69.9 ml dibutylmagnesium (50 millimoles), and 130 ml hexane. The mixture was heated to 60°–70° C. for one hour. After cooling to room temperature, a slurry was obtained. THF at a THF/Mg ratio of 0.05 did not solubilize all of the magnesium disiloxide. The procedure was repeated using 5.0 ml of a 1.0 molar THF in hexane solution. After cooling to room temperature overnight, a viscous solution was obtained. A THF/Mg ratio of 0.10 solubilized the magnesium disiloxide.

EXAMPLE 10

Utility of an organic ether solubilized RMgR and PMHS reaction product as a component in a polyolefin catalyst was determined experimentally. In this experiment, the solution of Example 6 was utilized together with a titanium halide.

A 1.0 molar solution (200 ml) of titanium tetrachloride (200 millimoles) in hexane was added dropwise to the stirred solution of Example 6. The solids were allowed to settle and the supernatant removed by decantation. The solids were reslurried with fresh hexane and the decantation procedure was repeated five more times to wash the solid free of hexane soluble species.

A portion of the catalyst slurry was diluted with hexane. An aliquot of this dilute catalyst containing 0.02 millimoles of titanium was added to a nitrogen purged, stirred, 1.8 liter reactor containing 600 ml of dry, oxygen-free hexane and 3.4 ml of 0.593 molar triethylaluminum. The reactor was pressured to 50 psig with hydrogen and vented to 0 psig. This procedure was then repeated three more times. The reactor pressure was adjusted to 10 psig with hydrogen and then 100 psig with ethylene. The reactor contents were heated to 80° C. and then ethylene was added to maintain a constant reactor pressure of 150 psig. After one hour, the reactor was cooled and vented. The reactor contents were filtered and the polyethylene dried in a vacuum oven at 70° C. until free of hexane. The polyethylene weighed 270 grams and had a melt index (ASTM 1238, Condition E) of 0.43. The catalyst efficiency was 282,000 grams of polyethylene per gram of titanium.

EXAMPLE 11

The use of an ether followed by halogenation to produce an olefin polymerization catalyst and resulting utility were illustrated.

Polymethylhydridosiloxane (13.4 ml, 220 mmoles Si) was slowly added to a sitred solution of 140 ml of 0.715 molar dibutylmagnesium and 4.1 ml tetrahydrofuran (50 mmoles). The solution temperature was maintained at 70°–80° C. for one hour and then cooled to room temperature. Tetraisopropyltitanate (6.0 ml, 20 mmoles) was added to the stirred solution followed by the dropwise addition of 175 ml of 1.149 molar ethylaluminum dichloride (200 mmoles).

A portion of the catalyst slurry was diluted with hexane. An aliquot of this dilute catalyst containing 0.005 millimoles of titanium was added to a nitrogen purged, stirred 1.8 liter reactor containing 600 ml of dry, oxygen-free hexane and 1.7 ml of 0.593 molar triethylaluminum. The reactor was pressured to 50 psig with hydrogen and vented to 0 psig. The procedure was repeated three additional times. The reactor pressure was adjusted to 10 psig with hydrogen and then 100 psig with ethylene. The reactor contents were heated to 80° C. and then ethylene was added to maintain a constant reactor pressure of 150 psig. After one hour, the reactor was cooled and vented. The reactor contents were filtered and the polyethylene dried in a vacuum oven at 70° C. until free of hexane. The polyethylene weighed 175.8 grams and had a melt index (ASTM 1238, condition E) of 0.26. The catalyst efficiency was 734,000 grams of polyethylene per gram of titanium.

EXAMPLE 12

Polymethylhydridosiloxane (64.1 ml, 1050 mmoles Si) was slowly added to a solution of 699 ml of 0.715 molar dibutylmagnesium (500 mmoles) and 20.4 ml of tetrahydrofuran (250 mmoles). The temperature was maintained at 70°–80° C. for 1 hour. The solution was cooled to room temperature and diluted to 1.0 liter so that the magnesium siloxide concentration was 0.5 molar.

An aliquot (100 ml, 50 mmoles Mg) of the above solution was mixed with 5.0 ml of 1.0 molar tetraisopropyltitanate (5.0 mmoles) in hexane. To this stirred solution was added 87 ml of 1.149 molar ethylaluminum dichloride (100 mmoles) dropwise.

An aliquot of this catalyst containing 0.001 millimoles of titanium was used in the polymerization procedure of Example 10. The recovered polyethylene weighed 123.9 grams and had a melt index (ASTM 1238, condition E) of 0.23. The catalyst efficiency was 2,590,000 grams of polyethylene per gram of titanium.

EXAMPLE 13

The catalyst procedure of Example 11 was repeated except using 2.0 ml of 1.0 molar tetraisopropyltitanate so that the catalyst had a Mg/Ti atomic ratio of 25.

The polymerization procedure of Example 11 was repeated and 154.8 grams of polyethylene was obtained. The polymer had a melt index (ASTM 1238, condition E) of 0.29. The catalyst efficiency was 3,230,000 grams of polyethylene per gram of titanium.

EXAMPLE 14

The copolymerization of ethylene and octene-1 to produce linear low density polyethylene under solution polymerization conditions is illustrated.

A 0.387 molar solution of mixed aluminum alkoxides was prepared using ISOPAR ®G. The mixed aluminum alkoxides were obtained by the controlled oxidation of a trialkylaluminum mixture in which the alkyl groups are linear, saturated alkyl groups containing two to thirty carbon atoms and the average being about 10 carbon atoms.

A 238.7 milliliter solution of the 0.387 molar mixed aluminum alkoxides was added to 500 ml of 0.739 molar dibutylmagnesium. To this solution was slowly added 47.3 ml of polymethylhydridosiloxane so that the temperature did not go over 70° C. The solution was heated for ½ hour at 70° C. and cooled to room temperature to give a magnesium siloxide support solution that was 0.465 molar in magnesium. A portion of this support solution was diluted to 0.1 molar with ISOPAR ®G.

The polymerization catalyst is formed by mixing the following ingredients in the order given:

6.3 ml of 0.1 molar magnesium siloxide support solution 88.7 ml of ISOPAR ® G
3.1 ml of 0.5 molar ethylaluminum dichloride
1.25 ml of 0.013 molar tetraisopropyltitanate
0.7 ml of 0.892 molar triethylaluminum in ISOPAR ® G A portion of the above catalyst containing 0.00163 millimoles of titanium is pressured with nitrogen into a stirred 1.8 liter stainless steel reactor containing 1.0 liters of ISOPAR ® G, about 5 psi hydrogen, 150 psi ethylene, and 50 ml octene-1 at a temperature of 185° C. The total reactor pressure is held constant by addition of ethylene. After 30 minutes of reaction, the reactor content is dumped into a 3.0 liter stainless steel resin kettle equipped with a reflux condensor. The solution is cooled to room temperature and the solvent removed. The polymer weight is 22.3 grams. The catalyst efficiency is 386,000 grams of polymer per gram of titanium. The polymer melt index is 15.4 and the density is 0.9265 g/cc (ASTM D-1505 using ASTM D-1928 for the sample preparation).

EXAMPLES 15 THROUGH 21

The effect of Cl/Mg atomic ratio upon catalyst efficiency was illustrated.

(a) Support Solution Preparation

Aluminum sec-butoxide (47.0 ml, 185 millimoles Al) was added to 1000 ml of 0.739 molar dibutylmagnesium (739 millimoles Mg) contained in a magnetically stirred 1.2 liter flask fitted with a heating mantel. To the resultant solution was added 94.6 ml of polymethylhydridosiloxane (1552 millimoles Si) dropwise at a rate so that the temperature did not go over about 70° C. The solution was then heated to maintain a temperature of about 70° C. for one-half hour. After cooling to room temperature the solution was analyzed for magnesium and a portion diluted with ISOPAR ® G to give a 0.1 molar support solution (b) Catalyst Preparation An aliquot of 0.5 molar ethylaluminum dichloride (EADC) in hexane was added to an ISOPAR ® G support solution as prepared in section 1(a). To the resultant slurry was added aliquots of 0.01 molar Ti(OiPr)4 (tetraisopropyltitanate) and 0.898 molar TEAL (triethylaluminum) in that order to give a catalyst slurry which contained 0.0025 millimoles of titanium per 10 ml of slurry. The exact volumes of reactants are listed in Table 1.

TABLE 1

| Example No. | ml of 0.1 m Support Solution | ml of Diluent | ml of 0.5 m EADC | ml of 0.01 m Ti(OiPr)4 | ml of 0.989 m TEAL | Atomic Ratios | | |
|---|---|---|---|---|---|---|---|---|
| | | | | | | Cl/Mg | Mg/Ti | TEAL/Ti |
| 15 | 12.5 | 81.1 | 2.5 | 2.5 | 1.4 | 2.0 | 50 | 50 |
| 16 | 12.5 | 80.5 | 3.1 | 2.5 | 1.4 | 2.5 | 50 | 50 |

TABLE 1-continued

| Example No. | ml of 0.1 m Support Solution | ml of Diluent | ml of 0.5 m EADC | ml of 0.01 m Ti(OiPr)$_4$ | ml of 0.989 m TEAL | Atomic Ratios Cl/Mg | Mg/Ti | TEAL/Ti |
|---|---|---|---|---|---|---|---|---|
| 17 | 12.5 | 79.8 | 3.8 | 2.5 | 1.4 | 3.0 | 50 | 50 |
| 18 | 12.5 | 78.6 | 5.0 | 2.5 | 1.4 | 4.0 | 50 | 50 |
| 19 | 12.5 | 77.3 | 6.3 | 2.5 | 1.4 | 5.0 | 50 | 50 |
| 20 | 12.5 | 76.1 | 7.5 | 2.5 | 1.4 | 6.0 | 50 | 50 |
| 21 | 12.5 | 73.6 | 10.0 | 2.5 | 1.4 | 8.0 | 50 | 50 |

Ethylene Polymerizations

An aliquot of each catalyst prepared as described in Table 1 was pressured with nitrogen into a stirred 1.8 liter stainless steel reactor containing 1.0 liters of ISOPAR ® G, about 5 psi hydrogen, and 150 psi ethylene at a temperature of 150° C. The total reactor pressure was held constant by addition of ethylene.

After 30 minutes of reaction, the reactor contents were dumped into a 3.0 liter stainless steel resin kettle equipped with a reflux condensor. The solution was cooled to room temperature and the solvent removed. The weights of solvent-free polymer and catalyst efficiencies are set out in Table 2.

TABLE 2

| Catalyst Example | Millimoles Titanium | Cl/Mg | g PE | Catalyst Efficiency | $I_{10}I_2$ | MI |
|---|---|---|---|---|---|---|
| 15 | .005 | 2.0 | less than 2 | less than 8,000 | — | — |
| 16 | .0025 | 2.5 | 21.42 | 179,000 | 7.8 | 0.165 |
| 17 | .0025 | 3.0 | 36.47 | 305,000 | 8.7 | 1.05 |
| 18 | .00125 | 4.0 | 37.95 | 634,000 | 7.6 | 2.11 |
| 19 | .00125 | 5.0 | 35.11 | 586,000 | 7.3 | 1.52 |
| 20 | .0025 | 6.0 | 33.57 | 280,000 | 7.7 | 1.25 |
| 21 | .0025 | 8.0 | 23.46 | 196,000 | 7.0 | 0.646 |

$I_{10}I_2$ ratios were determined wherein $I_2$ is the melt index of ASTM 1238 condition E and $I_{10}$ as a high load melt index (ASTM 1238 condition N0 to give a ratio of 15.6. The higher the $I_{10}I_2$ ratio, the broader the molecular weight distribution of the polymer.

EXAMPLE 22

The use of an ether followed by halogenation to produce an olefin polymerization catalyst and resulting utility were illustrated.

Polymethylhydridosiloxane (64.1 ml, 1050 mmoles Si) was slowly added to a stirred solution of 699 ml of 0.715 molar dibutylmagnesium and 20.4 ml tetrahydrofuran (250 mmoles). The solution temperature was maintained at not over 80° C. for one hour and then cooled to room temperature and diluted to 1 liter. To 100 ml of this solution was added a tetraisopropyltitanate solution (2.0 ml, 5 mmoles), followed by the dropwise addition of 87 ml of 1.149 molar ethylaluminum dichloride (100 mmoles).

A portion of the catalyst slurry was diluted with hexane. An aliquot of this dilute catalyst containing 0.001 millimoles of titanium was added to a nitrogen purged, stirred 1.8 liter reactor containing 600 ml of dry, oxygen-free hexane and 1.7 ml of 0.593 molar triethylaluminum. The reactor was pressured to 50 psig with hydrogen and vented to 0 psig. The procedure was repeated three additional times. The reactor pressure was adjusted to 10 psig with hydrogen and then 100 psig with ethylene. The reactor contents were heated to 80° C. and then ethylene was added to maintain a constant reactor pressure of 150 psig. After one hour, the reactor was cooled and vented. The reactor contents were filtered and the polyethylene dried in a vacuum oven at 70° C. until free of hexane. The polyethylene weighed 154.8 grams and had a melt index (ASTM 1238, condition E) of 0.29. The catalyst efficiency was 3,230,000 grams of polyethylene per gram of titanium.

EXAMPLE 23

The broadening of polymer molecular weight distribution by varying the Cl/Mg atomic ratio is illustrated.

A. A 107.5 milliliter portion of the 0.465 molar magnesium siloxide support solution prepared in Example 14 was mixed with 18 ml of hexane and 4.72 ml of 1.06 molar tetraisopropyltitanate in hexane. To the resultant solution was added dropwise, 87 ml of 1.149 molar ethylaluminum dichloride to give a catalyst slurry having a Mg/Ti atomic ratio of 10 and a Cl/Mg atomic ratio of 4.

B. The procedure of section (A) was repeated using 174 ml of 1.149 molar ethylaluminum dichloride to give a catalyst slurry having a Mg/Ti atomic ratio of 10 and a Cl/Mg atomic ratio of 8.

C. A portion of the catalyst slurry was diluted with hexane. An aliquot of this dilute catalyst containing 0.002 millimoles of titanium was added to a nitrogen purged, stirred, 1.8 liter reactor containing 600 ml of dry, oxygen-free hexane and 2.5 ml of 0.100 molar triethylaluminum. The reactor was pressured to 50 psig with hydrogen and vented to 0 psig. The procedure was then repeated three more times. The reactor pressure was adjusted to 30 psig with hydrogen and then 100 psig with ethylene. The reactor contents were heated to 80° C. and then ethylene was added to maintain a constant reactor pressure of 150 psig. After one hour, the reactor was cooled and vented. The reactor contents were filtered and the polyethylene dried in a vacuum oven at 70° C. until free of hexane. The results are outlined in Table 3.

TABLE 3

| Catalyst | Cl/Mg | Polymerization g PE | Catalyst Efficiency Kg PE/g Ti | $I_2$ | Polymer $I_{10}I_2$ |
|---|---|---|---|---|---|
| 23-A | 4 | 174.3 | 1,820 | 4.26 | 7.7 |
| 23-B | 8 | 145.3 | 1,520 | 1.67 | 10.1 |

EXAMPLE 24

This example illustrates the importance of selecting the optimum cocatalyst/titanium molar ratio for the desired reactor temperature in order to maximize the catalyst efficiency.

A. A catalyst slurry was prepared in which the cocatalyst (triethylaluminum)/Ti molar ratio was 25 by mixing the following ingredients in a magnetically stirred bottle in the order listed:

12.5 ml—0.1 molar support solution prepared in Example 15a
81.6 ml—ISOPAR ® G 2.7 ml—1.149 molar ethylaluminum dichloride
2.5 ml—0.01 molar tetraisopropyltitanate in ISO-PAR ® G
0.7 ml—0.892 molar triethylaluminum B. A catalyst slurry was prepared in which the cocatalyst/Ti molar ratio was 100 by mixing the following ingredients in a magnetically stirred bottle in the order listed:

2.5 ml—0.1 molar support solution prepared in Example 15a
79.5 ml—ISOPAR ® G
2.7 ml—1.149 molar ethylaluminum dichloride
2.5 ml—0.01 molar tetraisopropyltitanate in ISO-PAR ® G
2.8 ml—0.892 molar triethylaluminum C. Six aliquots of the catalysts prepared in sections A and B were pressured with nitrogen into a stirred 1.8 liter stainless steel reactor containing 1.0 liters of ISO-PAR ® G, the psi hydrogen given in Table 4, and 140 psi ethylene at a temperature given in Table 4. The total reactor pressure was held constant by addition of ethylene.

After 30 minutes of reaction, the reactor contents were dumped into a 3.0 liter stainless steel resin kettle equipped with a reflux condensor. The solution was cooled to room temperature and the solvent removed. The polymer weights, catalyst efficiency, and polymer melt index ($I_2$) are listed in Table 4.

TABLE 4

| Aliquot | Example No. | Approximate psi $H_2$ | Millimoles Ti | Reactor Temp. °C. | Cocatalyst Ti Ratio | g PE | Catalyst Efficiency Kg PE/g Ti | $I_2$ |
|---|---|---|---|---|---|---|---|---|
| 1 | 24A | 5 | .0025 | 150 | 25 | 33.6 | 281 | 1.4 |
| 2 | 24A | 5 | .0025 | 185 | 25 | 37.5 | 313 | 2.9 |
| 3 | 24A | 0 | .0025 | 220 | 25 | 31.3 | 261 | 8.4 |
| 4 | 24B | 5 | .00125 | 150 | 100 | 37.9 | 633 | 10.9 |
| 5 | 24B | 5 | .0025 | 185 | 100 | 40.7 | 340 | 10.2 |
| 6 | 24B | 0 | .0025 | 220 | 100 | 17.6 | 147 | 8.1 |

EXAMPLE 25

This example illustrates the use of tin tetrachloride as a halogenating agent.

A. A catalyst slurry was prepared by mixing the following ingredients in a magnetically stirred bottle in the order listed:

12.5 ml—0.1 molar support solution prepared in Example 15a
69.7 ml—ISOPAR ® G
12.5 ml—0.1 molar tin tetrachloride in ISOPAR ® G
2.5 ml—0.01 molar tetraisopropyltitanate in ISO-PAR ® G
2.8 ml—0.892 molar triethylaluminum B. A 10 ml aliquot of the catalyst prepared in section A was pressured with nitrogen into a stirred 1.8 liter stainless steel reactor containing 1.0 liters of ISO-PAR ® G, about 5 psi hydrogen, and 150 psi ethylene at 150° C. The total reactor pressure was held constant by addition of ethylene.

After 30 minutes of reaction, the reactor contents were dumped into a 3.0 liter stainless steel resin kettle equipped with a reflux condensor. The solution was cooled to room temperature and the solvent removed. The polymer weighed 28.3 grams. The catalyst efficiency was 236,000 grams of polyethylene per gram of titanium. The polymer had a melt index of 0.41.

In order to broaden molecular weight distribution of produced slurry polymers, it is necessary that the Cl/Mg atomic ratio produced by transition metal halides be less than about 0.5, the additional chlorine in the final catalyst obtained from an aluminum or boron compound, or mixtures of these, which chloride is added in a final chlorinating step. Thus, as described in this specification, at least 80% of the total chloride in the final Cl/Mg ratio is obtained from aluminum or boron sources, or mixtures of these. It is preferred that even more of the total chloride be obtained from aluminum or boron (90% or more).

While certain embodiments and details have been shown for the purpose of illustrating this invention, it will be apparent to those skilled in this art that various changes and modifications may be made herein without departing from the spirit or scope of the invention.

I claim:

1. A method for carrying out polymerization reactions utillzing at least one olefin containing from 2 to 30 carbon atoms in a solution polymerization system contacting said olefin with a catalyst prepared by a method comprising (a) contacting a hydrocarbon insoluble magnesium compound of the general formula

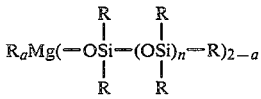

with sufficient aluminum alkoxide and/or organic ethers to render the magnesium compound hydrocarbon soluble, wherein the aluminum alkoxides have the general formula Al(Q)$_3$, wherein each Q can be OR$^1$ or R$^1$, but at least one Q must be OR$^1$, and wherein the organic ethers of the general formula R$^2$OR$^3$, wherein R$^2$ and R$^3$ can optionally have mutual covalent bonds to form cyclic ethers, and R, R$^1$, R$^2$, and R$^3$, are, independently, alkyl groups containing from 1 to 20 carbon atoms, aryl, aralkyl, and alkaryl groups, each containing from 6 to 20 carbon atoms, R can also be hydrogen or alkoxy groups containing from 1 to 20 carbon atoms, a is 0 or 1 and n is from 0 to about 100, with (b) non-halide transition metal alkoxides having at least one general formula

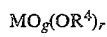

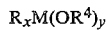

wherein M is titanium, vanadium, chromium or zirconium, each R$^4$ is, independently, alkyl groups containing from 1 to 20 carbon atoms, aryl groups, alkaryl groups, and aralkyl groups each containing from 6 to 20 carbon atoms as defined, g is 0 or 1, r is 2 to 4, and 2g+r is equal to the valence of M; p is at least 2; and x+y is equal to the valence of M and the magnesium to titanium ratio is at least 1:1, then
  (c) reacting the mixture of (a) and (b) with a halogenating agent to obtain a polymerization catalyst having a halogen to magnesium ratio of at least 2.0.

2. The polymerization as described in claim 1 wherein the non-halide transition metal alkoxide contains at least one material selected from the group consisting of tetraisopropyltitanate, tetra-n-butyltitanate, tetrabis(2-ethylhexyl) titanium, tri-n-butyl vanadate, tetra-n-propylzirconate and tetra-n-butylzirconate, iso—$C_3H_7$—O[Ti(O—iso—$C_3H_7$)$_2$—O]$_{10}$ iso$C_3H_7$, butyl (triisopropoxy) titanium and mixtures thereof.

3. A method as described in claim 2 wherein the halogenating agent is a chlorinating agent.

4. A method as described in claim 3 wherein the chlorinating agent is at least one material selected from the group consisting of ethylaluminum dichloride, diethylaluminum chloride, ethylaluminum sesquichloride, methyl and isobutyl analogs of these, tin tetrachloride, silicon tetrachloride, trichlorosilane, hydrogen chloride, aluminum chloride, ethylboron dichloride, boron chloride, diethylboron chloride, chloroform, phosphorous trichloride, phosphorous oxytrichloride, acetyl chloride, thionyl chloride, sulfur chloride, methyl trichlorosilane, dimethyl dichlorosilane, titanium tetrachloride, vanadium oxytrichloride and vanadium tetrachloride.

5. A method as described in claim 4 wherein the chlorinating agent is selected from the group consisting of diethylaluminun chloride, ethylaluminum dichloride and ethyl aluminum sesquihalide, methyl and isobutul analogues of these.

6. A method as described in claim 5 wherein the aluminum alkoxide and/or organic ether is contacted with the magnesium compound at levels of from about 0.05 moles per mole of magnesium to about 2 moles per mole of magnesium, based on the weight of the magnesium compound present.

* * * * *